T 866,019

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 702

801,843

METHOD FOR PREPARING STABILIZED SUSPENSIONS OF AMMONIUM POLYPHOSPHATE FERTILIZER

Wendell D. Burch, 1705 N. 7th, and John T. Minor, 1910 Meadowbrook, both of Ponca City, Okla. 74601

Filed Feb. 24, 1969. Published Sept. 16, 1969

Int. Cl. C05b *7/00;* C05g *1/06*

U.S. Cl. 71—29

No Drawing. 4 Pages Specification

An ammonium phosphate fertilizer solution which has begun to hydrolyze toward formation of a gel is converted to a quite stable suspension fertilizer by incorporating therein a solid or liquid fertilizer nutrient such as urea, ammonium nitrate, ammonium sulfate, potassium choride or potassium nitrate. If the hydrolysis of the ammonium polyphosphate solution has proceeded to the solid gel state, the said gel can be converted to a suspension fertilizer by agitating the same with water to form a viscous liquid, and incorporating in the latter an aforesaid solid or liquid fertilizer nutrient.